United States Patent [19]
Dammar

[11] 3,927,469
[45] Dec. 23, 1975

[54] METHOD OF WINDING ARMATURES
[75] Inventor: Raymon H. Dammar, Minneapolis, Minn.
[73] Assignee: Possis Corporation, Minneapolis, Minn.
[22] Filed: Mar. 22, 1973
[21] Appl. No.: 342,551

Related U.S. Application Data
[60] Division of Ser. No. 130,649, April 2, 1971, which is a continuation-in-part of Ser. No. 721,805, April 16, 1968, abandoned.

[52] U.S. Cl. ............ 29/597; 29/205 C; 29/205 CM; 29/598; 242/7.03; 242/7.05 B
[51] Int. Cl.² ...................................... H02K 15/09
[58] Field of Search ......... 29/596, 597, 598, 205 C, 29/205 CM, 205 R; 310/234; 242/7.05 B, 7.05 C, 7.05 R, 7.03

[56] References Cited
UNITED STATES PATENTS

| | | |
|---|---|---|
| 2,779,886 | 1/1957 | Hunsdorf ..................... 242/7.05 R |
| 3,163,921 | 1/1965 | Applegate ..................... 242/7.05 R |
| 3,585,716 | 6/1971 | Steinke ................................ 29/597 |
| 3,628,229 | 12/1971 | Biddison et al. ..................... 29/597 |

*Primary Examiner*—Carl E. Hall

[57] ABSTRACT

A method of and machine for winding armatures wherein the stretches of wire that extend from the flyers of the machine to the commutator tangs to which the starting and ending leads of a wound armature are attached, are gripped and cut close to those tangs, the grip on said wires being maintained while the wound armature is removed from the machine and replaced with an unwound armature core assembly and until the starting leads of the windings to be applied to the unwound core are attached to their respective commutator tangs, and then with the wires still gripped they are cut close to the tangs to which they are attached, whereupon the grips on the wires held thereby are released.

25 Claims, 28 Drawing Figures

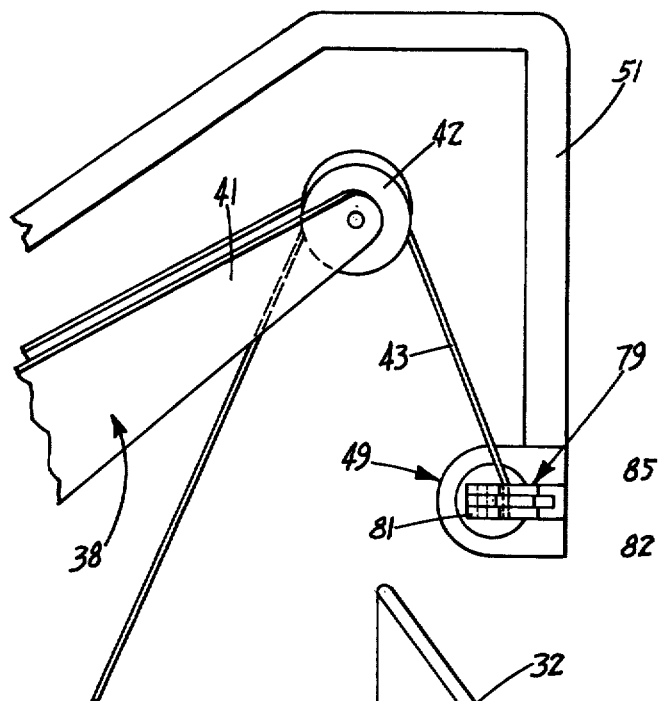
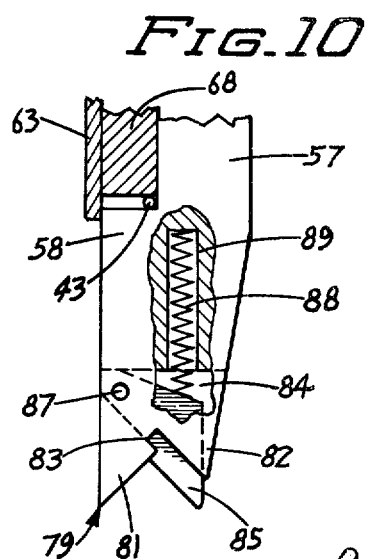
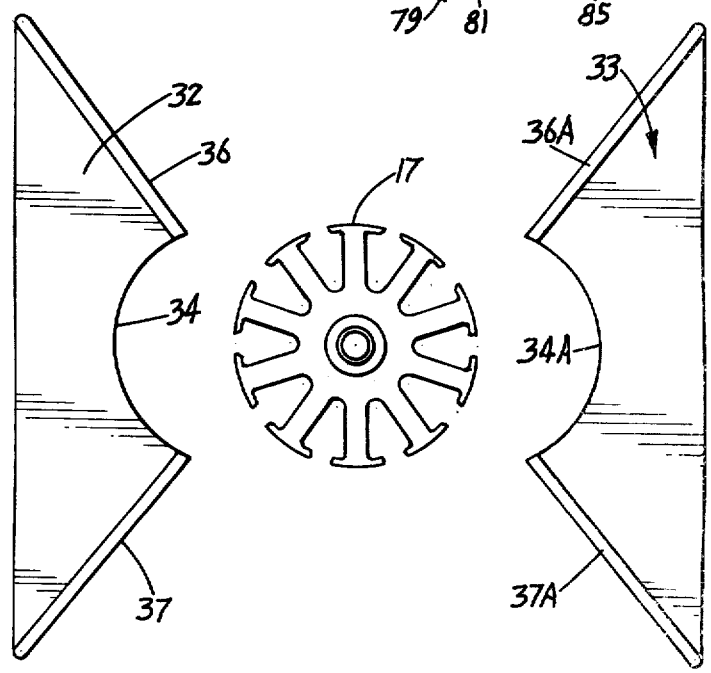

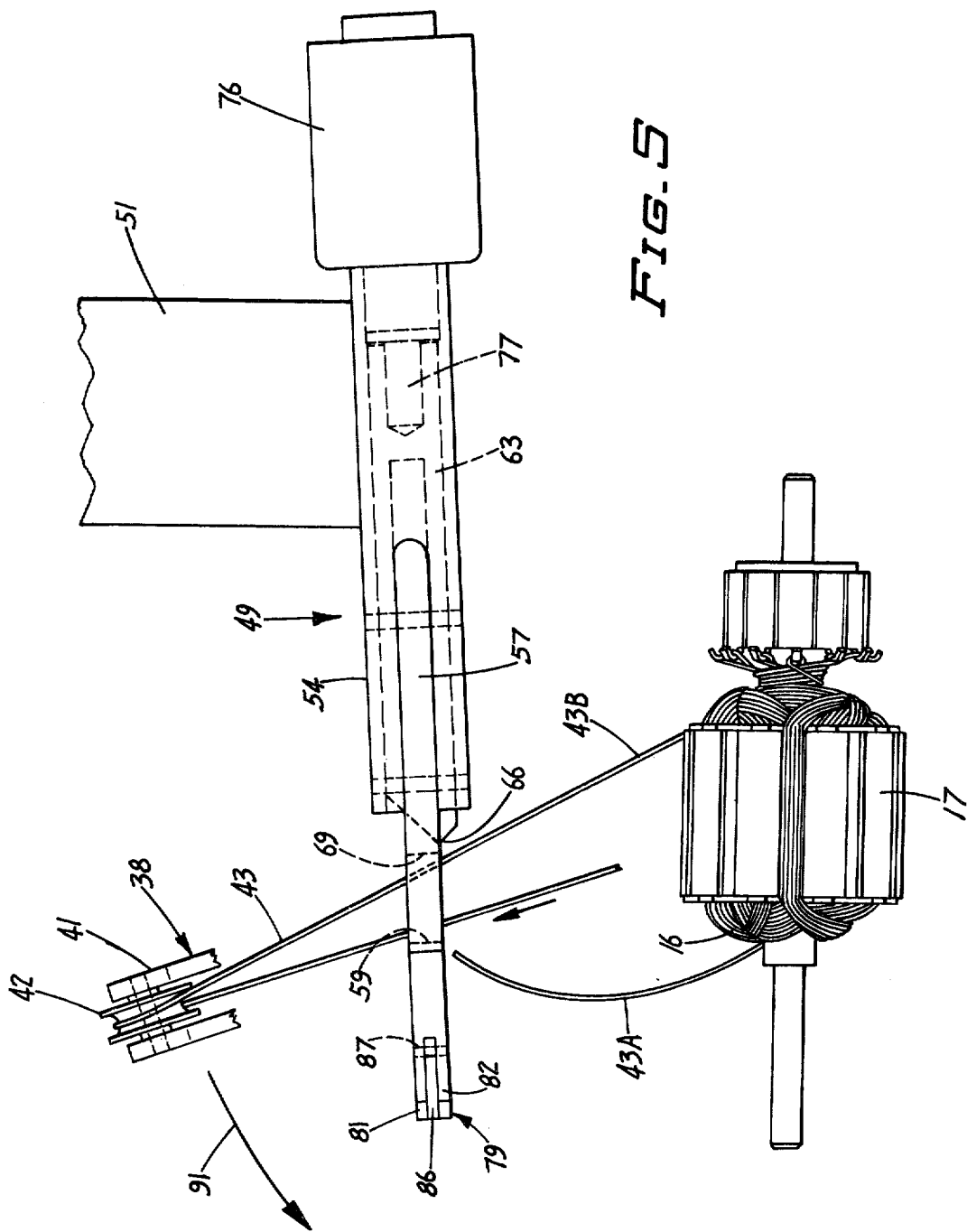

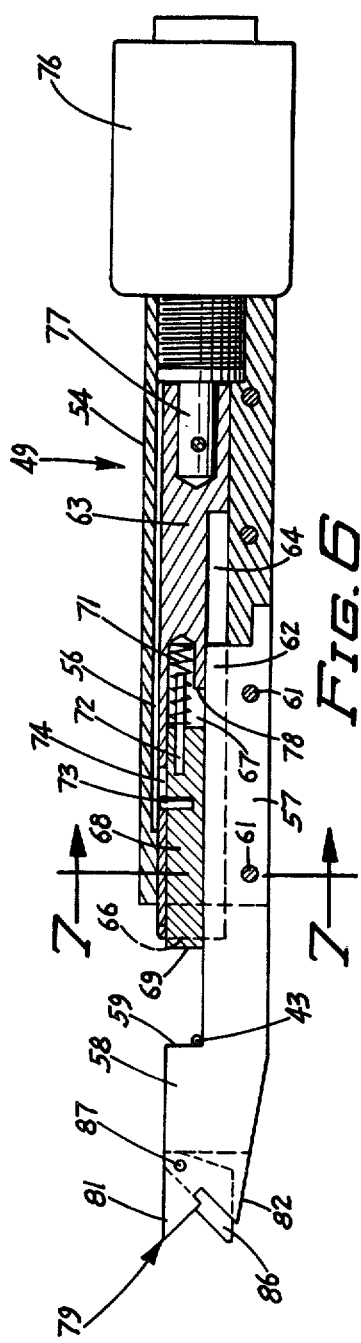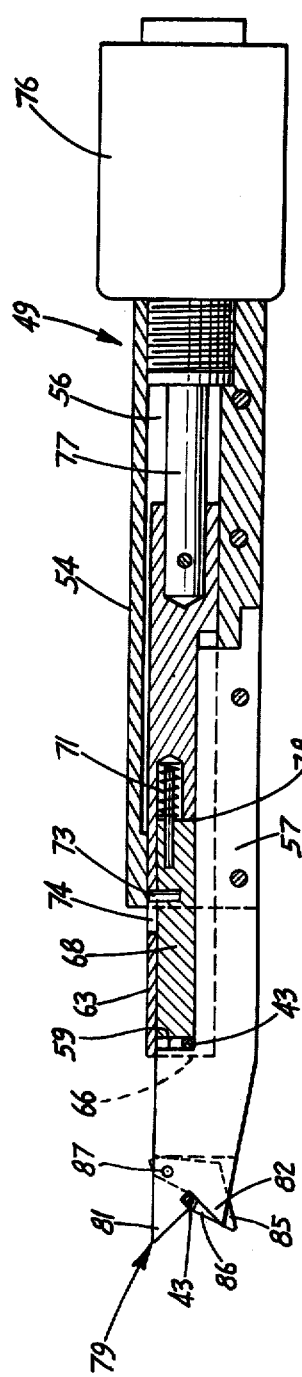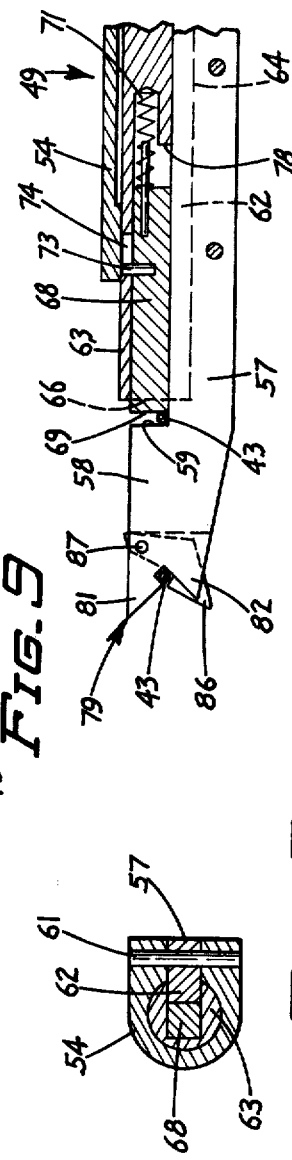

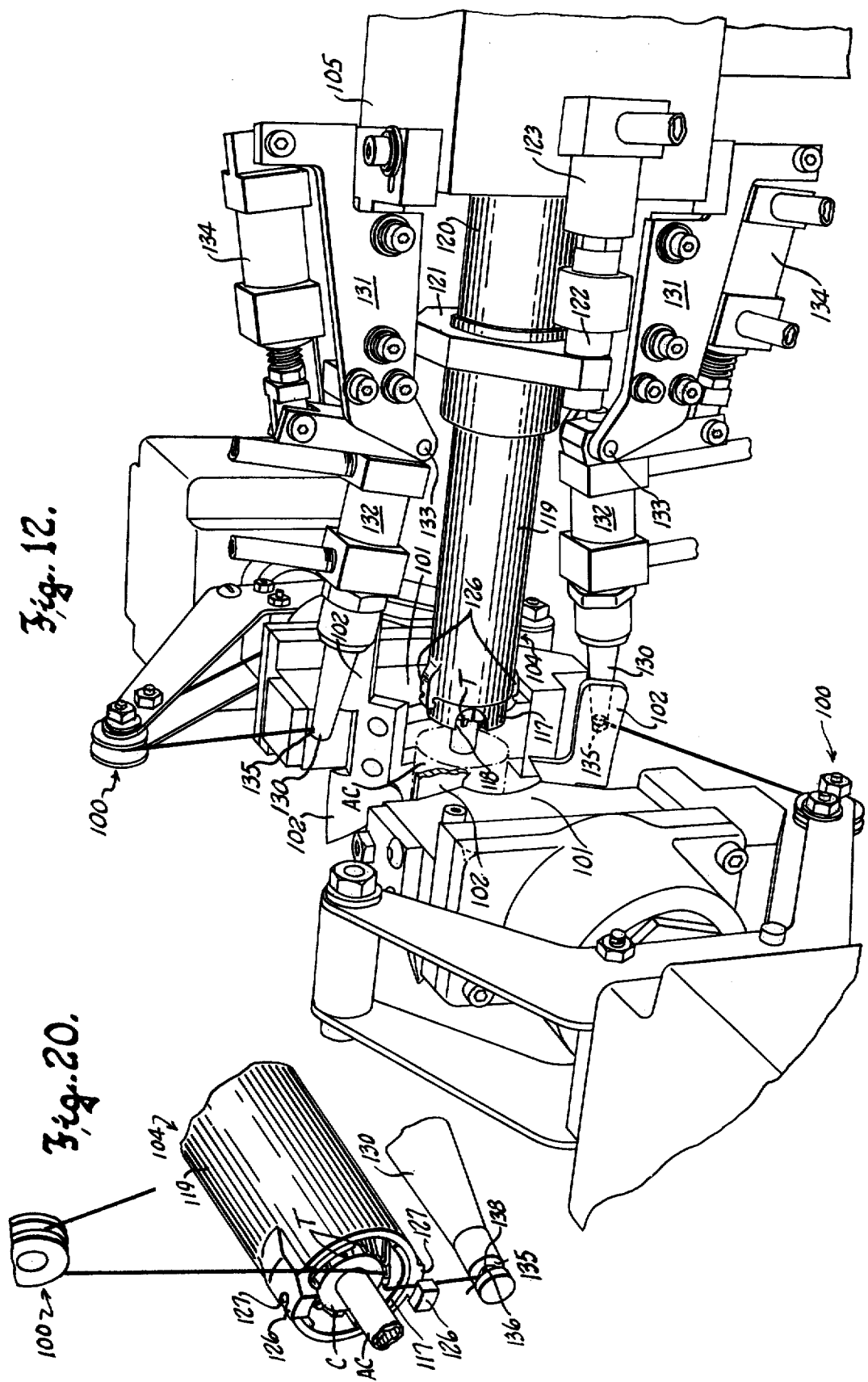

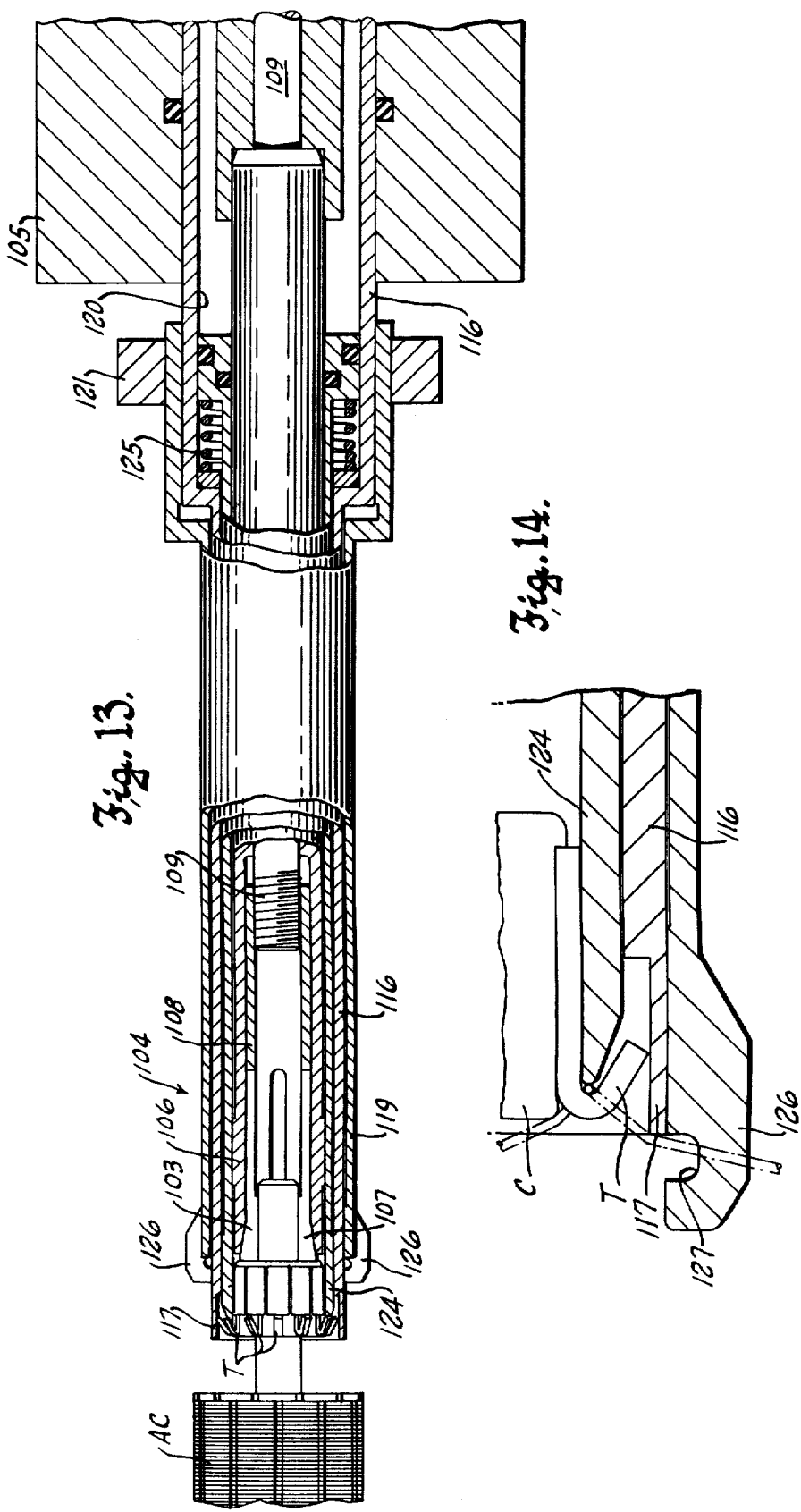

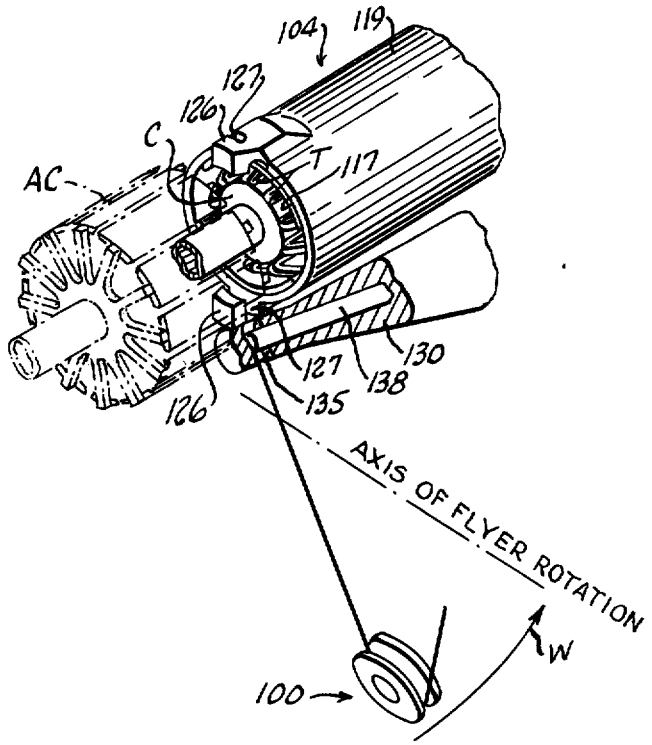
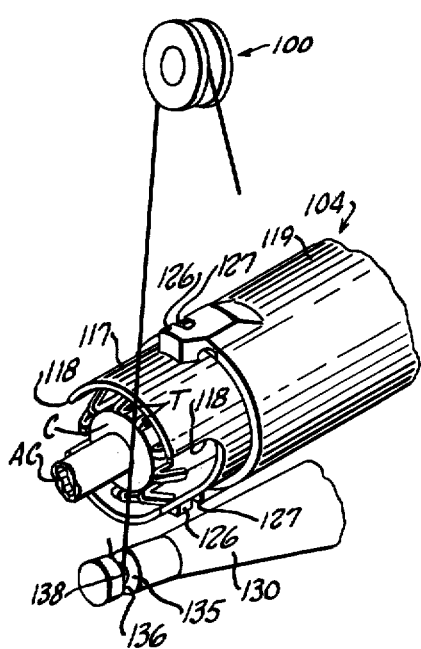
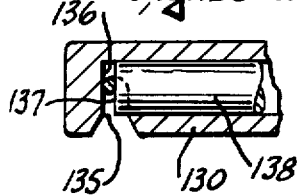
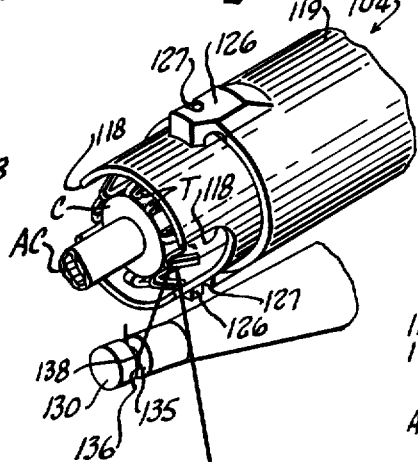
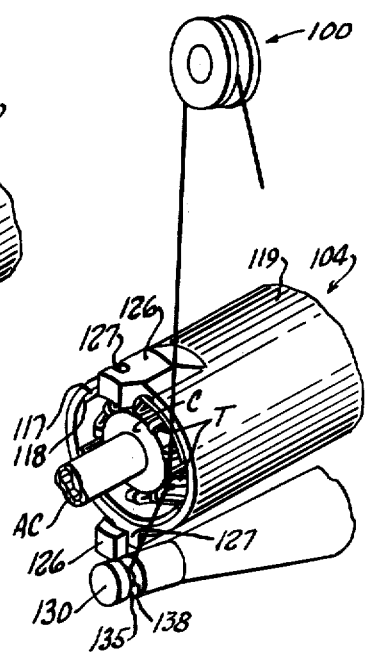
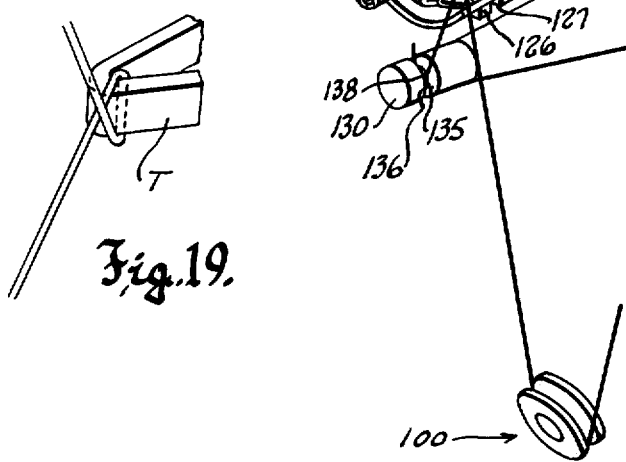

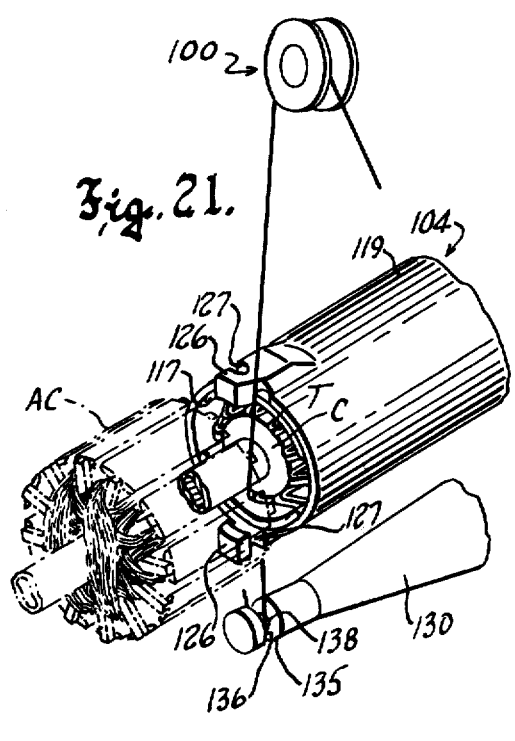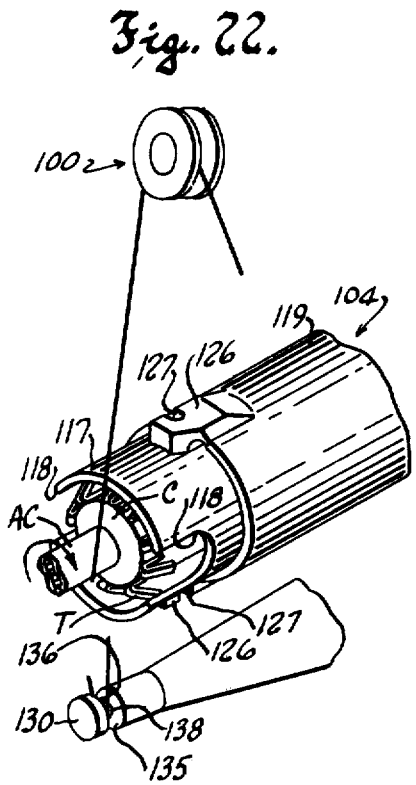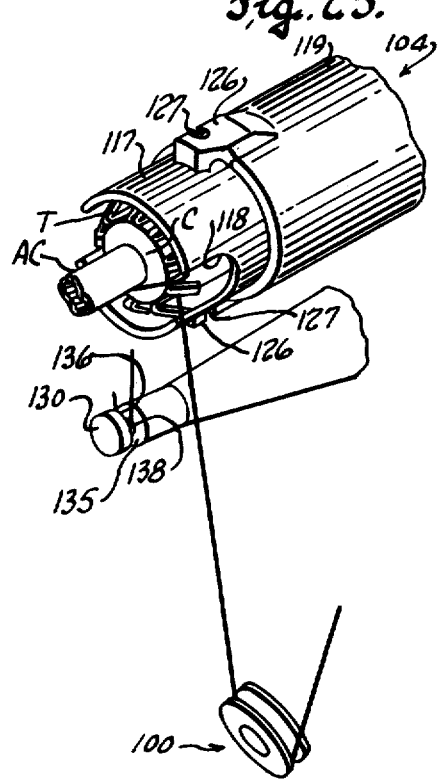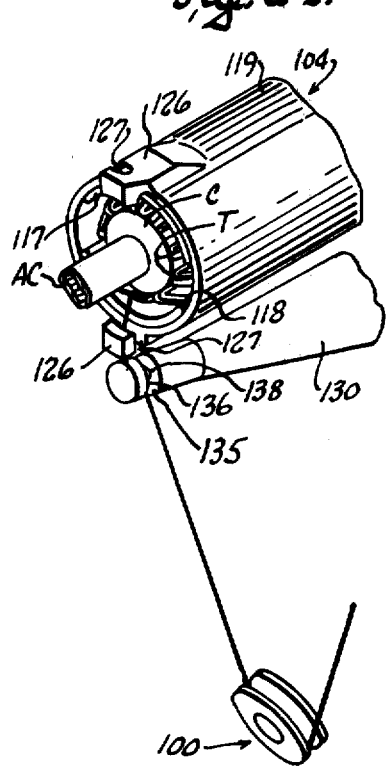

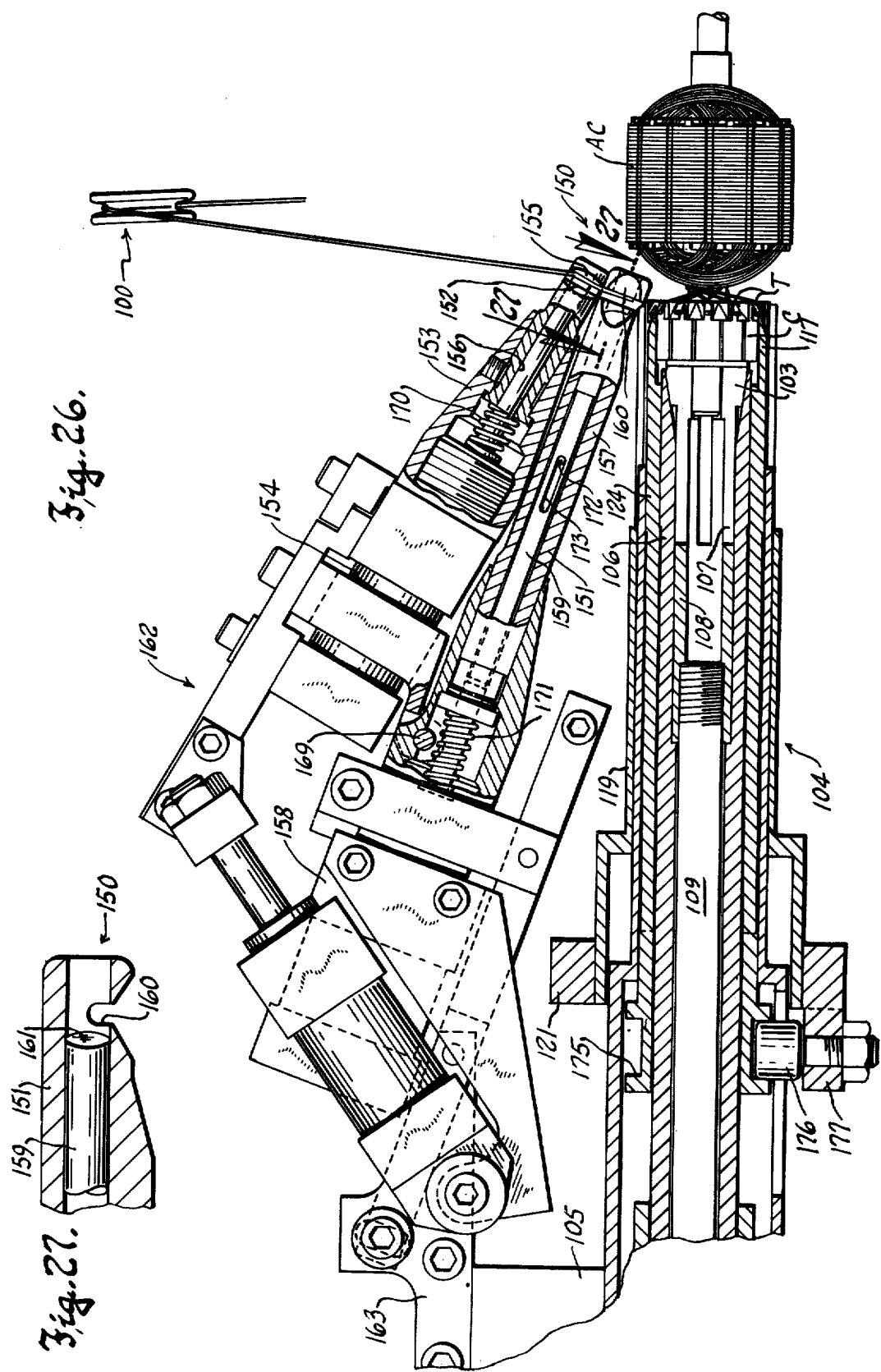

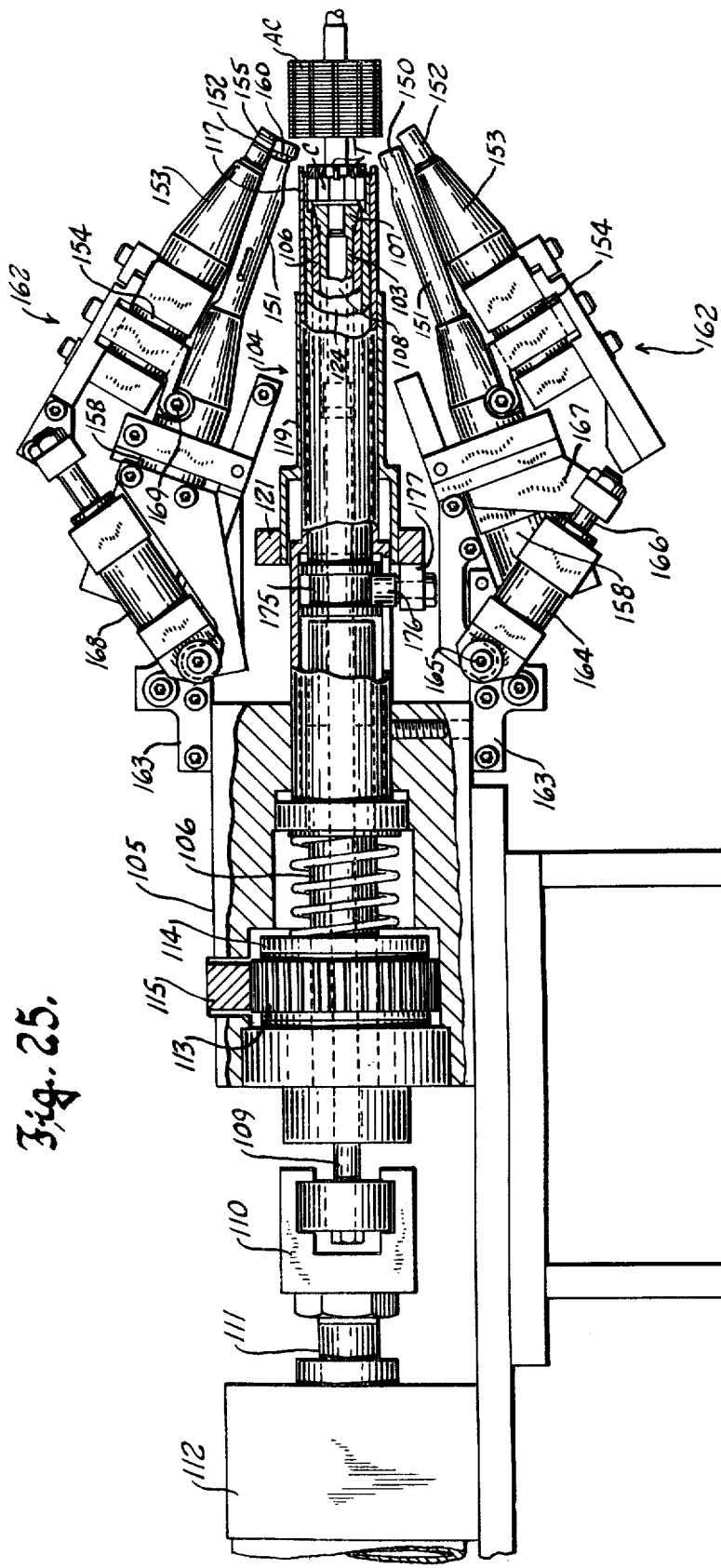

METHOD OF WINDING ARMATURES

This application is a division of the pending application Ser. No. 130,649, filed Apr. 2, 1971 as a continuation-in-part of the now abandoned application Ser. No. 721,805 filed Apr. 16, 1968, and hence the invention disclosed herein has as its purpose to minimize the waste of wire used in the winding of armatures, and also obviate the need for trimming leads from the wound armatures.

Armatures are now wound on automatic winding machines which usually have two flyers that rotate in opposite directions and in spaced orbits about a common axis which intersects and is normal to the axis of the armature core being wound. Each flyer draws wire from a supply thereof and winds it into a pair of angularly spaced core slots. Upon completion of each coil wound by a flyer, the ending lead from that coil is attached to a selected commutator tang, which attachment may be effected in the manner described in the pending application of Raymon H. Dammer, Ser. No. 246,949, filed Apr. 24, 1972 as a division of the now abandoned application, Ser. No. 787,426 filed Dec. 27, 1968, and then — with the armature core indexed to bring other paired core slots into winding receiving positions — the flyers again wind coils onto the core so that each flyer will wind a series of connected coils onto the armature core. When all coils in each series have been wound, the stretches of wire that lead from the flyers to the commutator tangs to which the ends of the series of coils are attached, must be severed to permit the wound armature to be removed from the machine.

Although winding machines heretofore available had provision for automatically cutting these stretches of wire, the mechanism for doing so made the cut at a substantial distance from the wound armature. Thus, for instance, in the Patent to Moore, U.S. Pat. No. 2,947,427, the stretches of wire that lead from the wound core at the completion of the winding operation remain uncut until winding of the next coil is begun. Hence, with the machine and method of the Moore patent, a wound armature core and a core being wound are tied together by relatively long lengths of wire, so that no matter where those lengths of wire are cut, a considerable amount of wire must be wasted.

In the embodiment of the invention that formed the subject matter of the aforesaid now abandoned application Ser. No. 721,805, the objective of the invention is achieved by providing wire gripping and wire cutting mechanism for each flyer that is located within the orbit of the flyer. In the two embodiments of the invention disclosed for the first time in the pending continuation-in-part application Ser. No. 130,649 of which this application is a division, the wire gripping and wire cutting means are located between the orbits of the flyers in close juxtaposition to the commutator tangs to which the leads of the coils are attached.

Briefly summarized, the present invention contemplates the winding of armatures on a coil winding machine of the type referred to, in which suitable core gripping means holds an armature core assembly in position to be wound; at least one flyer rotatable about an axis substantially intersecting and normal to the axis of the armature core assembly in position to be wound, draws wire from a source thereof and winds it into a pair of angularly spaced core slots; wire gripping means is actuatable to grip the stretch of wire which leads from the flyer to the core upon completion of the last coil to be wound onto the armature core and cessation of coil winding rotation of the flyer; wire cutting means in juxtaposition to the wire gripping means severs the stretch of wire being held by the wire gripping means with the cut located between the wound armature and the wire gripping means, so that upon severance of the wire the wire gripping means can and does retain its hold on the end of the wire drawn from the source thereof in preparation for the winding of the next succeeding armature core; and the gripping means is actuated to release the end of the wire in its grasp after winding of the next succeecding armature core is begun and to again grip the stretch of wire leading from the flyer to the armature core when the winding of the core is completed.

In addition to the foregoing which applies to all embodiments of the invention disclosed herein, the improved version of the invention disclosed for the first time in application Ser. No. 130,649 is distinguished by the fact that the wire outwardly of the commutator tang to which the starting lead of the armature winding is attached, as well as the wire outwardly of the tang to which the ending lead is attached, is severed directly adjacent to its respective commutator tang so that when the wound armature is removed from the winding machine, there are no dangling wires to be trimmed off.

The improved version of the invention also contemplates having the wire gripping means move outwardly away form the armature core while it has the wire in its grasp, to remove slack in the stretch of wire leading from the commutator tang to the wire gripping means and draw it taut in preparation to being severed by the wire cutting means.

Still another feature of the improved version of the invention resides in the provision of means for holding a lead which has been attached to a commutator tang against displacement therefrom so that as soon as the stretch of wire of which the starting lead of an armature winding will be formed has been attached to its tang, the wire outwardly of that tang can be severed directly adjacent to the tang.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of the embodiments of the apparatus used in the practice of the invention, constructed according to the best modes so far devised for the practical application of the principles thereof, and in which:

FIGS. 1 through 11 illustrate the lowercase of the invention disclosed in the now abandoned parent application Ser. No. 721,805

FIG. 1 is a fragmentary front elevational view of a coil winding machine incorporating one embodiment of the invention;

FIG. 2 is an enlarged front elevational view of an armature core between the open core gripping chucks of the machine illustrated in FIG. 1, and illustrating one of the flyers and its associated wire gripping and cutting mechanism;

FIG. 3 is a view similar to FIG. 2, showing the relative positions of the wire gripping and cutting mechanism, the flyer and the core gripping chucks during the winding of a coil onto a slotted armature core;

FIG. 4 is a view similar to FIG. 2, showing the relative positions of the wire gripping and cutting mechanisms, the flyer and the core gripping chucks, with the latter again in their open positions at the end of a winding operation;

FIG. 5 is a side elevational view of one of the wire gripping and cutting mechanisms and of the wound armature, showing the starting lead released and the ending lead in position about to be gripped and severed;

FIG. 6 is a longitudinal sectional view of the wire gripping and cutting mechanism in the open wire receiving position;

FIG. 7 is a cross sectional view taken on the plane of the line 7—7 in FIG. 6;

FIG. 8 is a view similar to a portion of FIG. 6 showing the wire gripped but not yet cut;

FIG. 9 is a view similar to FIG. 6 but with the parts thereof in the positions they occupy after the wire has been cut;

FIG. 10 is an enlarged top plan view partially in section, of the wire holder that is located at the outer end of each gripping and cutting mechanism; and FIG. 11 is a top plan view of the wire holder, showing the same holding a lead.

FIGS. 12 through 24 illustrate the preferred embodiment of the invention

FIG. 12 is a perspective view of those protions of a coil winding machine requiring illustration to depict the preferred embodiment of the invention;

FIG. 13 is a side view, with parts broken away and in section, of the core holding and commutator shielding structure of the machine shown in FIG. 12;

FIG. 14 is a fragmentary detail view, in section and at an enlarged scale, of the front end portion of the structure shown in FIG. 13;

FIGS. 15, 16, 17 and 18 are perspective views of the core holding and commutator shielding structure, with a core in position therein and illustrating successive steps in the attachment of the starting lead to one of the commutator tangs of the core about to be wound;

FIG. 15a is a fragmentary detail sectional view through the wire gripping means;

FIG. 19 is a perspective view illustrating the attachment of the starting lead to its respective tang;

FIG. 20 (on Sheet 7) is a perspective view similar to FIGS. 15-18, but showing how the starting lead is brought into position to be severed; and FIGS. 21, 22, 23 and 24 are perspective views similar to FIGS. 15-18 and 20, but showing the sequence of events which occur during severance of the ending leads at the conclusion of the armature winding cycle.

FIGS. 25, 26 and 27 illustrate a modification of the preferred embodiment of the invention FIG. 25 is a side view with parts thereof broken away and in section, of the essential elements of a modification of the preferred embodiment of the invention;

FIG. 26 is a view similar to FIG. 25, but illustrating only one of the two wire gripping and cutting mechanisms with which the machine is equipped, and at a larger scale; and FIG. 27 is a detail sectional view taken on the plane of the line 27—27 in FIG. 25.

THE EMBODIMENT OF THE INVENTION DISCLOSED IN APPLICATION SER. NO. 721,805

Figure 1:
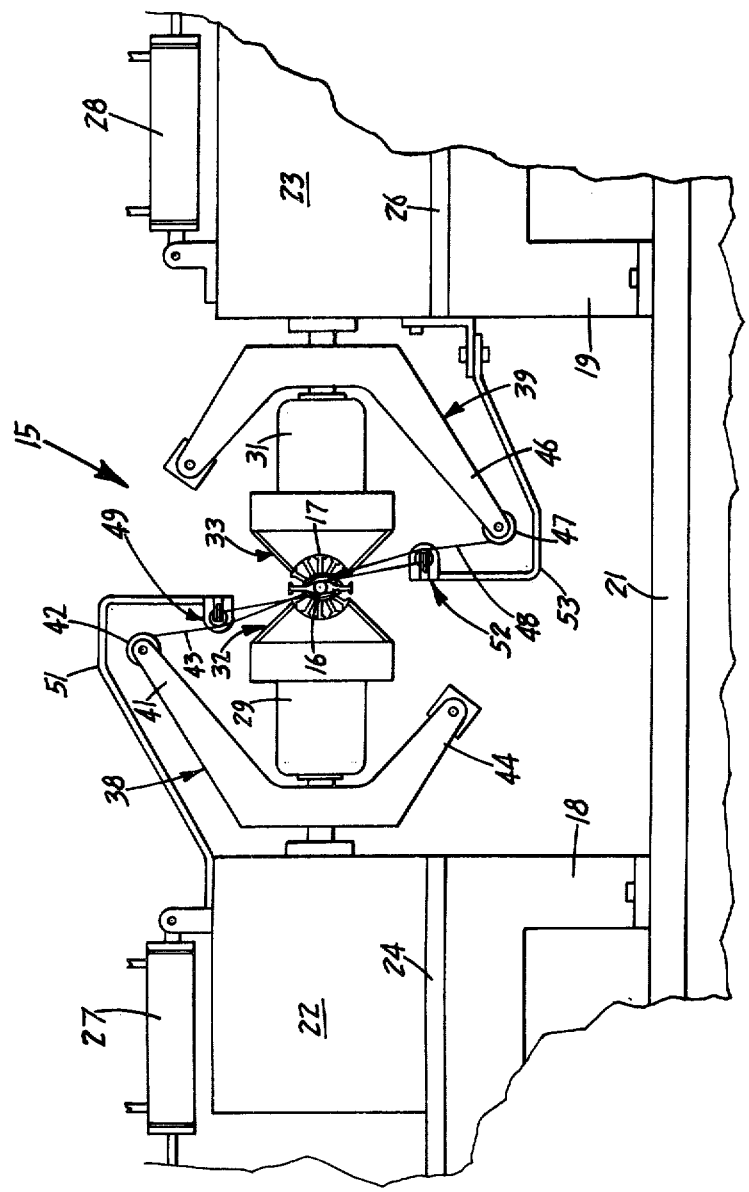
Figure 11:
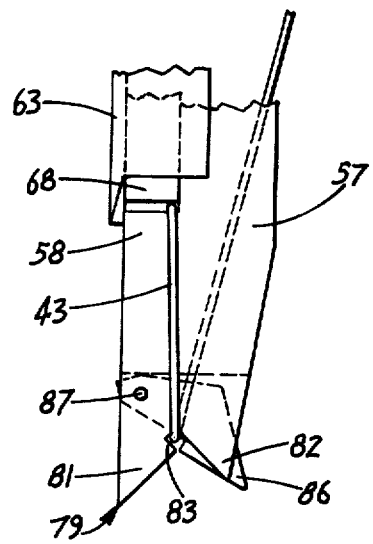

Referring to FIGS. 1 through 11, which illustrate one embodiment of the apparatus employed in the practice of the invention, the numeral 15 designates generally a conventional armature winding machine by which coils of wire 16 are wound onto a core 17, such as a slotted armature rotor of an electric motor, generator or other similar machine. The frame of the machine 15 includes a pair of spaced supports 18 and 19 mounted on a horizontal table 21. Housings or bearing blocks 22 and 23 are mounted on the supports 18 and 19 by horizontal slides 24 and 26 for translatory horizontal movement toward and away from one another. Any suitable means, such as an air cylinder (not shown) may be used to move the housings 22 and 23; and double acting cylinders 27 and 28 secured to the housings 22 and 23, respectively serve to power indexing mechanism (not shown) by which the core is rotated or indexed as required to bring different pairs of core slots into coil receiving postions.

Coaxial shafts 30 and 30' project from the housings 22 and 23 to support horizontal arms 29 and 31 which project toward one another and terminate in chucks or shrouds 32 and 33, respectively. The opposing faces of these chucks or shrouds are shaped to provide the usual arcuate concave recesses 34 which conform to the curvature of the core 17 to grip the same and hold it in position to be wound, with all but four of slots in the core covered.

Figure 3:
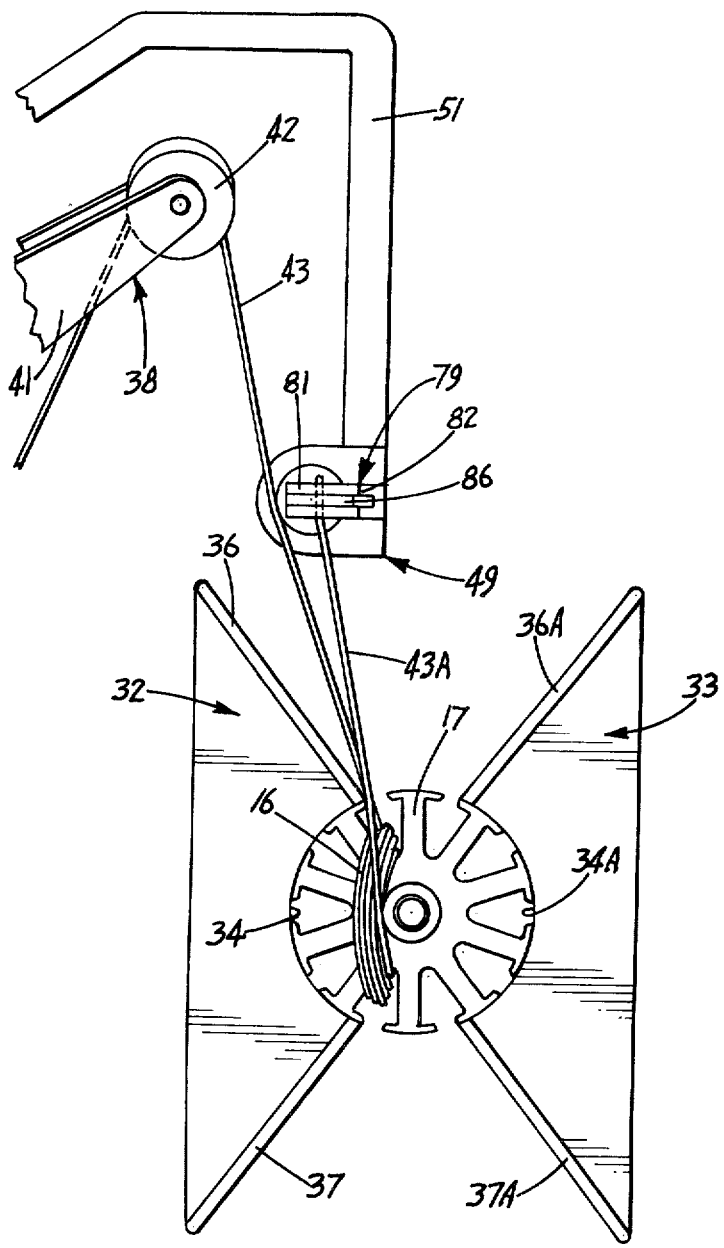

From the top and bottom edges of the arcuate concave recesses 34 the shrouds have outwardly diverging surfaces 36 and 37 to guide wire into the uncovered slots, as best seen in FIG. 3.

The coils of wire 16 are wound on the core 17 by a pair of conventional rotatable flyers, indicated generally by the numerals 38 and 39, which are fixed to the shafts 30 and 30' to be driven thereby in coaxial circular and axially spaced orbits. The flyers are identical and have arms 41 and 46 at the outer ends of which there are pulleys 42 and 47 which provide guides for the wires 43 and 48 being wound onto the core 17. A second weighted arm 44 balances each of the flyers.

Each flyer winds a series of coils on the armature core, and as is customary and shown in FIG. 5, the successive coils are connected by lead wires which are attached to the tangs of the commutator of the armature.

Located between the outer ends of the flyer arms and their respective core gripping chucks or shrouds 32-33 are wire gripping and cutting mechanisms, indicated generally by the numerals 49 and 52. Arms 51 and 53 support the wire gripping and cutting mechanisms from the housings 22 and 23 so that the wire gripping and cutting mechanisms partake of any adjustment of the shrouds 32-33 and the flyers toward and away from the core 17.

As will be seen, the wire gripping and cutting mechanisms 49 and 52 are located in close proximity to the core 17 within the circular orbits of the flyer pulleys. Heretofore, in winding machines equipped with automatic lead cutting means, the mechanism for doing so was most commonly mounted in front of the area between the supports 18 and 19, which is so far removed from the flyers that the length of the wires outwardly of the commutator tangs to which the starting and ending leads of the wound armatures were attached had to be about 10 inches long to reach the cutting mechanism. Those wires had to be cut from the wound armatures and constituted waste.

With the embodiment of this invention illustrated in FIGS. 1–11, only about 4 inches is wasted, and in the other embodiments of the invention shown in FIGS. 12–26, it is considerably less. The saving in wire effected by this invention is at least on the order of 2 feet per core; and with the preferred embodiment of the invention the saving is appreciably more. A busy factory winds thousands of cores per day — hence, the daily saving in wire amounts to several thousand feet.

The wire gripping and cutting mechanisms 49 and 52 are identical in structure and function. Each holds the end of the stretch of wire that leads from the flyer, at the commencement of the winding operation, releases the same at an appropriate time during the winding of the coils, and again grips and cuts it at the completion of the winding operation. The wound core then can be removed from the winding machine. A feature of the wire gripping and cutting means is that the wire is in the grasp of the wire gripping means at the time it is cut and that the cut is made between the wire gripping means and the core. Accordingly, each wire gripping means can, and does, retain its grasp upon the end of the wire leading from the flyer until the winding of the next-to-be-wound armature core is underway.

Though the following description will relate only to the wire gripping and cutting mechanism 49 and its respective flyer 38 and shroud 32, it applies as well to the wire gripping and cutting mechanism 52.

As depicted in FIGS. 6, 7 and 9, the wire gripping and cutting mechanism 49 comprises an elongated body 54 which is fixed to and supported by the arm 51 and has a longitudinally extending bore 56 therein opening to its outer end. A flat bar 57 is secured to the body 54 with an edge portion thereof received in a longitudinal slot 64 in the body that opens into the bore 56. Pins 61 secure the bar to the body with the said one edge portion of the bar projecting into the bore 54 to form a key 62, and with the outer end portion of the bar projecting endwise beyond the body.

The outer projecting end portion of the bar is shaped to provide an upstanding jaw 58 having a square edged face 59 facing the body. The face 59 forms one of the jaws of the wire gripping means and also provides one edge of the wire cutting means. The other jaw of the wire gripping means is provided by the flat end surface 69 of a wire holding member 68 that is endwise slidable along the bar 57, and the other edge of the wire cutting means is the foremost V-shaped edge 66 of a shearing member 63 that is slidably received in the bore 56.

In cross section, the bar 57, the holding member 68 and the shearing member 63 are so related that the edge 66 slides across one side of the bar to have shearing coaction with the adjacent edge of the face 59, and the flat end 69 of the holding member is directly opposed to the face 59 to coact therewith in gripping a wire.

The holding member 68 is reciprocably seated in a groove 67 formed in the outer end portion of the shearing member, which groove opens to the slot 64 and hence is closed by the key forming portion 62 of the bar 57, see FIG. 7. A lost motion connection between the shearing member and the holding member enables both of these parts to be reciprocated in unison while accomodating relative endwise movement therebetween. This lost motion connection is provided by a pin 73 which projects from the holding member into an elongated slot 74 in the shearing member. A spring 71 seated in a well in the inner end of the groove 67 and encircling a pin 72 that projects from the adjacent end of the holding member yieldingly takes up the lost motion in connection between these parts, and yieldingly maintains the outer end 69 of the holding member forwardly of the knife edge 66, as shown in FIGS. 5 and 6.

The shearing member 63 is reciprocated by an air motor 76 mounted on the rear end of the body 54, with its plunger 77 projecting into the bore 56 and secured to the shearing member. During the initial portion of the forward stroke of the air motor 76, both the shearing member 63 and the holding member 68 move in unison toward the jaw 58. This concomitant advance continues until, as shown in FIG. 8, the outer end 69 of the holding member 68 collides with and clamps the wire lead 43 against the face 59 of the jaw 58. Thereafter, by virtue of the lost motion connection between the shearing member and the holding member, only the shearing member continues its advance and, in doing so, causes its cutting edge 66 to move past the face 59 with a shearing action which cuts the wire. FIG. 9 illustrates the parts in the positions they occupy after the wire has been cut.

Attention is directed to the fact that, as best shown in FIG. 5, the knife edge 66 of the shearing member slides across the side of the bar 57 which faces the armature core. Hence, the cut — when made — is located between the wire gripping means and the armature core, permitting the wound core to be removed without disturbing the grasp of the wire gripping means on the end of the stretch of wire coming from the flyer. To assure the maintenance of a secure grip on the wire, the end 78 of the shearing member abuts against the adjacent end of the holding member to provide a positive force applying connection between the air motor and the wire holding member.

To better position the stretches of wire leading from the flyers, with respect to the next core to be wound, a wire holder — indicated generally by the numeral 79 — is mounted on the forward end of each of the wire gripping and cutting mechansims 49 and 52. Each of these holders comprises a pair of forwardly projecting divergent fingers 81 and 82, with a recess 83 at their junction to receive the wire lead 43. The diverging fingers 81 and 82, as shown in FIGS. 5 and 10, have a transverse slot 84 in which a latch 85 is located and pivotally mounted by a pin 87. The front edge of the latch is stepped, as at 86, to coact with the recess 83 in confining a wire, and — as shown in FIG. 10 — a spring 88 in a bore or well 89 biases the latch 85 towards its closed position.

In operation, and considering only the winding done by the flyer 38, the end of the stretch of wire 43 coming from the flyer is anchored, as shown in FIG. 2, by being placed in the grasp of the wire gripping and cutting mechanism 49. The housing 22 is then moved toward the core 17 to position the shroud 32 adjacent to the side of the core 17, as shown in FIG. 3, and to also dispose the flyer 38 and the wire gripping and cutting mechanism 49 in their operative positions relative to the core 17. Upon initial movement of the flyer arm 41, the wire 43 is carried over the end of the holder 79 and falls into the recess 83 to be retained therein by the latch 85. The recess 83 allows the wire to move linearly while holding the same where it does not interfere with the winding of the coil 16 onto the core 17, as shown in FIG. 3.

It is, of course, understood that during the winding of an armature core, each flyer winds a series of coils into paired angularly spaced slots in the core, and that between the winding of successive coils, the core is indexed to bring another pair of slots into coil receiving positions, and the leads connecting the successive coils are attached to the tangs of the commutator of the armature.

Figure 4:
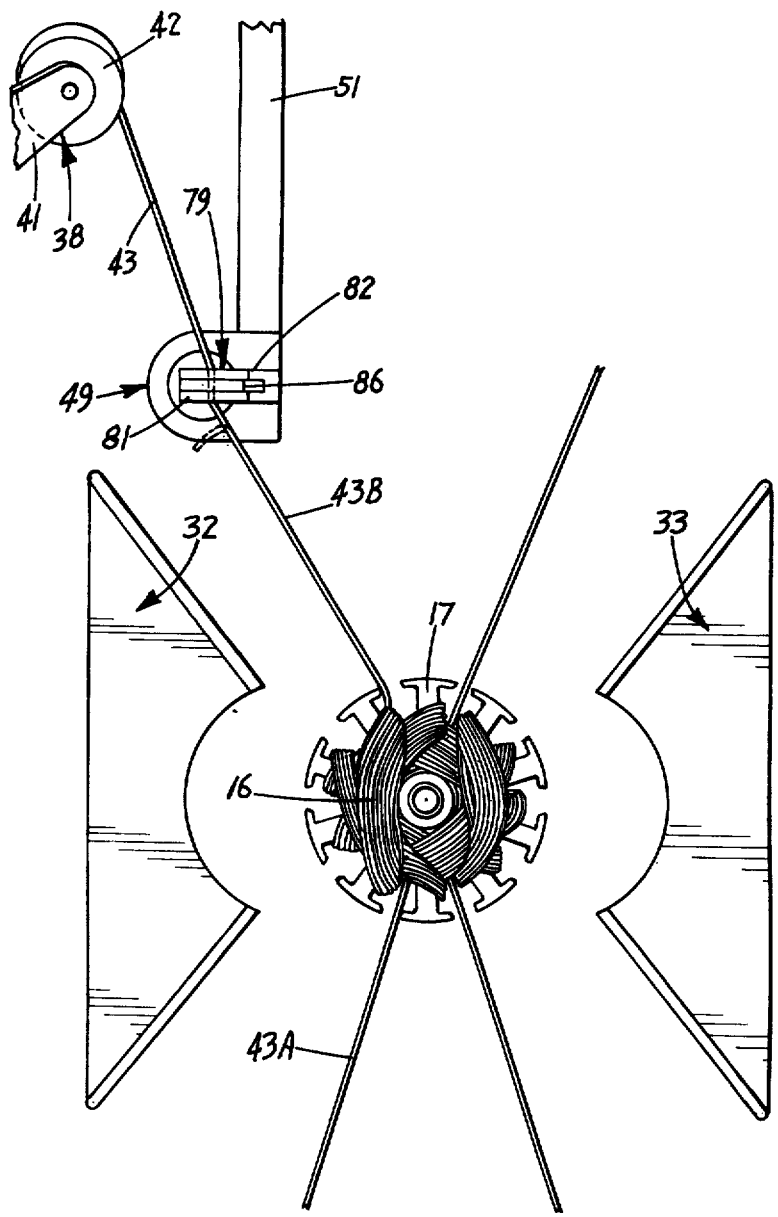

After all of the slots in the armature 17 have had coils 16 wound therein, the holding member 68 and the shearing member are retracted to allow the stretch of wire 43B coming from the commutator tang to which the ending lead of the last coil wound by the flyer 38 to drop into the space between the jaw face 59 and the face 69 of the holding member, so that upon actuation of the air motor 76, the stretch of wire 43B will be clamped between the faces 59 and 69, as shown in FIGS. 4 and 8, and — immediately thereafter — the air motor moves the shearing member 63 forward far enough to carry its knife edge 66 beyond the face 59, whereupon that stretch of wire 43B is cut at that side of the wire gripper which faces the armature core.

Since the shearing member remains in its projected position after the cut is made, it covers the notch or space between the jaw 58 and the front end 69 of the holding member, and thus keeps the wire being wound onto the next core from catching on any part of the wire gripping and cutting mechanism. Obviously, though, at the completion of the winding operation, the air motor 76 is automatically actuated to retract the shearing member and, with it, the wire holding member to enable the wire to drop into the space between the faces 59 and 69 preparatory to being gripped and cut.

THE PREFERRED EMBODIMENT OF THE INVENTION FIGS. 12–23.

In the embodiment of the invention just described, and which constitutes the subject matter of the now abandoned parent application, Ser. No. 721,805, the desired reduction in length of the wire wasted is achieved by having the wire gripping and cutting mechanisms located within the orbit of the rotating flyers so that the wound armature core need not be moved from between the chucks 32 and 33 until the wires are cut. In the preferred embodiment of the invention, an even greater reduction in the length of wire wasted is made possible by locating the wire gripping and cutting mechanisms between the orbits of the two rotating flyers, and in close proximity to the circle of commutator tangs of an armature core in winding receiving position.

As will be explained hereinafter, the only wire wasted in winding an armature in accordance with the preferred embodiment of the invention, is a piece not much longer than 1 inch; but, more important, with this embodiment of the invention the starting lead — as well as the ending lead — is cut from the stretch of wire of which it is formed so close to the commutator tang to which it is attached that no need exists for trimming off any wire after the wound armature is removed from the machine.

With particular reference to FIG. 12, it will be seen that the machine for practicing the preferred embodiment of the invention also has a pair of flyers 100 opposing one another and mounted for rotation about a common axis that intersects and is normal to the axis of an armature core AC in position to be wound. Also, as in the previously described embodiment of the invention, the slotted armature core is embraced by a pair of shrouds 101 during the winding operation, which shrouds cover all but the two pairs of angularly spaced core slots into which the rotating flyers are to wind coils. And, to guide the wire into these paired slots, the shrouds 101 have guide wings 102 which function in the conventional manner to guide the stretches of wire being wound onto the core into the proper slots.

In this machine, the armature core — though embraced by the shrouds 101 — is held in position to be wound by core gripping means 103 (FIG. 13) which forms part of a combined core gripping, core rotating and commutator shielding unit, indicated generally by the numeral 104. This unit projects forwardly from a stationary part 105 of the machine frame.

The core gripping means is a conventional collet by which one end portion of the armature core shaft is gripped after the core has been manually placed in position. This collet consists of an outer tubular element 106 with a tapered socket in its outer end in which the jaws 107 of the collet are received, the latter being provided by the taperingly enlarged outer split end of an inner tubular collet element 108. Hence, upon insertion of the armature core shaft into the mouth of the collet jaws and rearward displacement of the inner collet member 108, the armature core is tightly gripped by the collet. A rod 109 threaded into the inner collet member provides for actuation of the collet. The manner in which the collet rod 109 is reciprocated forms no part of this invention and hence is not illustrated in FIG. 13, though in FIG. 25 — which is one of the views illustrating a modification of the preferred embodiment of the invention — the collet rod 109 is shown connected through a rotation accommodating coupling 110, with the piston 111 of an air cylinder 112. Obviously, by controlling the admission of air pressure to the cylinder, the collet can be actuated to grip and release an armature core.

FIG. 25 also illustrates the structure by which armature core indexing rotation is imparted to the core gripping means, i.e. the collet. For this purpose, a gear 113 is mounted on the outer tubular element 106 of the collet and drivingly connectible thereto through a unidirectional clutch, indicated by the numeral 114, so that rotation of the gear 113 by reciprocation of a rack 115 in one direction, imparts rotation to the collet while — during movement of the rack in the opposite direction — the collet is held against turning. In this manner, indexing rotation is imparted to an armature core in the grasp of the collet. The means for reciprocating the rack to effect indexing of the core forms no part of this invention and can be of any conventional type; hence, it has not been illustrated.

Returning to the description of the preferred embodiment of the invention, and with specific reference to FIG. 13, the coacting elements of the collet are inside and coaxial with a tube 116 which extends forwardly from and is fixed to the frame part 105. The outer end portion of this tube has its inside diameter increased to provide a thimble 117 which receives the hook-like tangs T of the commutator C of an armature core gripped by the collet. Although the lengthwise position of the tube 116 must be adjustable to assure its outer end being properly positioned with respect to a particular size armature core, it has no movement — either axial or rotatable — in the performance of its function.

As best seen in FIGS. 16, 17, 22 and 23, the thimble 117 has diametrically opposite notches 118 opening to its end to expose two diametrically opposite commutator tangs when a tubular shield 119 encircling the tube 116 is retracted from its operative shielding position in which the open ends of the tube 116 and the shield are coterminous, as in FIGS. 15, 18, 20, 21 and 24.

The tubular shield 119 is axially slidable on the tube 116 but not rotatable. Its rear end is enlarged to fit the adjacent end portion of the tube 116 which is also enlarged to provide a cylinder 120 for a purpose to be described. A collar 121 fixed to the enlarged rear end of the tubular shield has the plunger 122 of an air cylinder 123 fixed thereto, so that by actuation of the air cylinder, the tubular shield may be projected to its operative position covering the notches 118 in the thimble and retracted to uncover the notches and expose two diametrically opposite commutator tangs.

Between the outermost tubular element 106 of the collet and the tube 116 is a tubular lead retaining member 124, the front end portion of which receives the commutator of an armature core gripped by the collet. The extreme front end of the lead retaining member is tapered so as to enter the hook-like tangs T upon outward projection thereof, and in so doing holds leads that have been attached to tangs from becoming detached. FIG. 14 illustrates the function of the retaining member. The retaining member is projected to its operative position by pressure fluid in the cylinder 120, and is retracted by a spring 125.

Not only does the tubular shield 119 coact with the thimble 117 to control exposure of the commutator tangs for the attachment of wire leads thereto, but also to sever the starting and ending leads of the armature winding from the stretch of wire of which they were formed, at the start and conclusion of the winding operation. For this purpose, the shield has two diametrically opposite hooks 126 projecting from its outer end to protrude beyond the end of the thimble when the shield is in its projected operative position. Each hook has a notch 127 in one side thereof to receive the lead to be cut, so that upon retraction of the shield, sharp inner edges of the notches coact with the circular edge formed by the junction of the end surface of the thimble with its cylindrical outer boundary, to effect a shearing action by which the wires are cut. The manner in which the wires are engaged in the notches 127 will be described later.

At this point it should be observed that the hooks 126 lie in a vertical plane containing the axis of an armature core in position to be wound, and hence are equispaced from the planes defined by the orbits of the flyers, whereas the notches 118 in the thimble lie in a horizontal plane that also contains the armature core axis. The presence of the hooks 126, therefore, does not interfere with the winding of the coils, since the stretches of wire extending from the flyers to the core simply slide along the opposite sides of the tubular shield.

The wire gripping means in the preferred embodiment of the invention comprises a pair of tubular fingers 130, mounted above and beneath the combined core gripping, core rotating and commutator shielding unit 104. The mounting of each finger 130 includes a stationary bracket 131 fixed to and projecting from the frame part 105 and an air cylinder 132 pivoted, as at 133, to the bracket. The finger 130 is fixed to and projects from the air cylinder so that by swinging the cylinder about its pivotal connection with the bracket, the outer free end of the finger can be moved towards and from the axis of an armature core in position to be wound. Such swinging movement is produced by an actuating cylinder 134 connected between the bracket and the cylinder 132.

In FIG. 12, the fingers 130 are at the outermost extremities of their range of swinging motion; in their innermost positions the ends of the fingers are directly adjacent to the top and bottom of the outer end portion of the tubular shield, as shown in FIGS. 15–18.

Each finger 130 has a notch 135 in the side thereof facing the orbit of its respective flyer, to receive a wire to be gripped. The axially inwardly facing side 136 of this notch coacts with the flat end 137 of a plunger 138 that is reciprocable in the tubular finger to grip a wire received in the notch. The plunger is connected to the piston of the cylinder 132 so that by the control of air pressure into the opposite ends of the cylinder 132, the plunger can be projected to grip a wire and retracted to release the wire.

Briefly considering the procedure involved in beginning the winding of an armature and in terminating the winding operation, and confining the description to only one of the two flyers, reference is first made to FIGS. 15–18. As shown in FIG. 15, an armature core is in position in the machine in place of one that had just been wound and removed from the machine. The end of the stretch of wire coming from the flyer 100 is in the grasp of the wire gripping finger 130 which is in its innermost position contiguous to the adjacent hook 126 on the tubular shield. The wire is in the grasp of the gripping finger as a result of the conclusion of the preceding winding operation and hence a tiny stub of wire projects from the gripping finger. The tubular shield is in its projected operative position.

The flyer is rotated in its winding direction, designated by the arrow W in FIG. 15, to carry the stretch of wire to its position shown in FIG. 16, at which time the shield is retracted to expose one of the commutator tangs and the tubular retaining member 124 is retracted to afford access to the exposed tang. The flyer is now rotated in the reverse direction and, as a result, the wire hooks itself onto the exposed tang, as shown in FIG. 17.

Attention is directed to the fact that the tang onto which the wire has hooked itself is spaced a distance from the gripper finger 130 and especially from its grasp on the end of the wire. As will later described, it is this distance that defines the length of wire that will be wasted.

After the condition shown in FIG. 17 is reached, the tubular shield is advanced to its operative position covering all of the tangs and the lead retaining member 124 is projected to its operative position to hold the wire against detachment from the tang onto which it hooked itself.

With the shield covering the tangs, the flyer is again rotated in the winding direction towards its position shown in FIG. 18, and during this interval the wire wraps itself around the tang and forms the desired alpha-type attachment shown in FIG. 19.

The next event in the sequence takes place while the flyer is at rest in its position shown in FIG. 18. It consists of imparting rotation to the armature core (in the clockwise direction in FIG. 18) by means of the collet gripping its shaft. Such rotation carries the core towards the position it is to occupy during the winding of the first coil. As the core is rotated, the tang to which the wire is attached moves towards the bottom one of the two hooks 126 and the gripper finger 130 moves downward to keep tension on the short stretch of wire which extends from the finger to the tang. The net result of these motions is entry of this stretch of wire into the notch 127 of the hook (as shown in FIG. 20) in preparation for severance of the starting lead from the wire in the grasp of the gripper finger 130, by retraction of the shield. This severance of the starting lead from the wire of which it was formed and which is being held by the gripper finger in nowise affects the attachment of the starting lead to the tang since, at this time, and until the winding of the first coil is well along, the lead retaining member 124 securely maintains the alpha-type attachment of the wire to the tang.

Since the cut is made at the edge of the thimble 117 (FIG. 14) the stub of wire which is left protruding from the tang is very short and needs no further trimming. Also, the length of wire left in the grasp of the gripper finger 130 is relatively short, being only as long as the arcuate distance the tang travels during approximately 90° of rotation of the core, plus the length of wire in the grasp of the gripper finger. That short piece of wire is all that is wasted, but it is retained in the grasp of the gripper finger until the winding operation is finished, to preclude its becoming entangled with the wire being wound onto the core.

Directly after the starting lead is severed from the piece of wire held by the gripper finger, the indexing rotation of the core is resumed and, since the cutting takes but a fraction of a second, it may be said that the cutting occurs during a momentary interruption of the indexing rotation.

Preferably, as already indicated, the retaining member 124 remains in its operative projected position until the winding of the first coil is well along, at which time the member 124 is retracted to remain inoperative and unneeded until the starting sequence of the next to be wound armature core takes place.

FIGS. 21–24 illustrate different stages in the termination of the ending lead. In FIG. 21, the winding of the last coil has been completed and the flyer is stopped with the stretch of wire leading from it to the core extending tangentially across one side of the armature shaft and across the end of the thimble 117 and the tubular shield 119. The gripper finger 130 with the short piece of wire that will be wasted in its grasp, occupies its position farthest from the tubular shield — that is, its lowermost position. It will remain in that position and retain its grasp upon the short piece of wasted wire until just before the ending lead is to be severed from the stretch of wire leading from the flyer.

In FIG. 22, the shield is retracted to expose the commutator tang then opposite the notch 118 in the thimble. Now clockwise rotation is imparted to the core and, by this rotation, the selected commutator tang is brought into line with the notch 118 so that, upon reverse rotation of the flyer, the wire hooks itself onto the selected tang, as shown in FIG. 23.

The shield is now advanced to cover the tangs and bring the wire cutting hook 126 into its potentially operative position, and the gripper finger 130 is actuated to bring the same to its position contiguous to the hook 126, and opened to drop the piece of wire it had been holding. Since both the notch 127 in the hook and the notch 135 in the gripper finger 130 face in the same direction — namely, towards the orbit of the flyer — and since the plunger 138 of the gripper finger is retracted, further rotation of the core (in the clockwise direction) carries the stretch of wire leading from the flyer to the core into the notch 127 of the hook and also into the notch 135 in the free end of the finger 130.

With the flyer stationary, the plunger in the finger 130 is projected to grip the wire that is now in the notch of the finger, and then — with the wire gripped — the shield is retracted to sever the wire very close to the tang from which it extends. The wound armature can now be taken from the machine, to be replaced by the next core to be wound.

THE MODIFICATION OF THE PREFERRED EMBODIMENT

FIGS. 25 – 27

The main difference between the preferred embodiment of the invention and the modification thereof illustrated in FIGS. 25, 26 and 27, is in the location of the wire cutting means. Instead of embodying the cutting means in the core gripping, core rotating and commutator shielding unit 104, the wire cutting means 150 of the modified embodiment is at the outer free end of a tubular finger 151 and hence is generally similar in construction and design to the wire gripping means of the preferred embodiment. The wire gripping means 152 of the modification is at the outer end of a tubular finger 153 projecting from an air cylinder 154. This finger has a notch 155 in one side of its outer free end portion, and a plunger 156 slidable in the finger coacts with the side of the notch nearest the outer extremity of the finger to grip a wire engaged in the notch, as in the preferred embodiment of the invention and as shown in FIG. 15A.

The wire cutting means 150 comprises a tubular finger 151 projecting from an air cylinder 158 and a plunger 159 slidable in the finger. The finger has a notch 160 in one side thereof near its outer extremity; but, in this case, the end 161 of the plunger not only enters the notch 160 but moves all the way across the notch and into a socket in the far side of the notch. Thus a wire received in the notch will be sheared, and to facilitate the shearing action the end 161 of the plunger is beveled, as shown in FIG. 27.

The two tubular fingers 152 and 157 and the air cylinders 154 and 158 from which they project are connected into a unitary assembly, identified generally by the numeral 162 which is pivotally connected to a pair of arms 163 that project from and are fixed to the frame 105. Hence the assembly 162 may be swung towards and from the axis of an armature core in position to be wound, to facilitate insertion and removal of armature cores. A cylinder 164 supported as at 165 with its plunger 166 connected to a frame 167 to which the cylinder 158 of the cutter finger is secured, provides the means for swinging the assembly towards and from the armature core axis.

As shown in FIG. 25, the assembly 162 is duplicated (one for each flyer) above and below the combined core gripping, core rotating and commutator shielding unit 104, and since the assemblies are duplicates of one another and the actuating cylinder 164 is at the near side in the lower assembly, in the upper assembly it is directly behind a cylinder 168 and hence not visible. The cylinder 168 provides means for swinging the gripper finger 153 outwardly from its position shown in FIG. 26, and it is by such outward swinging movement of the gripper finger that the wire lead in its grasp can be drawn taut before it is cut.

The pivot about which the gripper finger 153 swings is indicated by the numeral 169 in FIG. 26. Also illustrated in this view is the fact that the plungers operating in the tubular wire gripping and wire cutting fingers are retracted by springs. For the wire gripping finger, the spring 170 is located near the outer end of the finger; and for the wire cutting finger, the spring 171 is located directly adjacent to the pivot 169 about which the finger swings. Outward projection of the plungers is effected by the associated cylinders 154 and 158.

To assure proper orientation of the beveled end 161 of the wire cutting plunger with respect to the wire in the notch 160, the plunger is restrained against rotation by a pin 172 extending diametrically across the tubular finger and through a slot 173 in the plunger.

The manner in which the wire gripping and cutting functions are performed in this modified embodiment of the invention is no doubt obvious from the foregoing description, but to assure completeness of the disclosure — at the completion of the winding operation the wire gripping finger closely overlies the wire cutting finger and their respective notches 155 and 160 are in line, as shown in FIG. 25. The plungers of both fingers are retracted. The stretch of wire which extends from the flyer to the commutator tang about which it had been wrapped is then caused to enter the notches 155 and 160 by appropriate rotation of the armature core. The air cylinder 154 of the wire gripping finger is activated to project its plunger 156 and thereby grip the wire.

The retracted plunger 159 of the wire cutting means is then projected by activation of its air cylinder 158, whereupon the wire is severed very close to the tang from which it extends.

Although not illustrated, the modified embodiment of the invention employs the same general procedure at the start of the winding operation as that followed in the preferred embodiment. Thus, at the very beginning of the winding operation, each gripper finger 153 is contiguous to its respective cutter finger 157 and holds the end of the wire coming from the flyer. After attachment of the wire to a commutator tang, the armature core is rotated to cause the wire coming from the tang to enter the notch in the cutter finger and, during that rotation, the gripper finger is swung away from the cutter finger to take up the slack in the wire which would otherwise result from rotation of the core; and then the plunger in the cutter finger is projected to sever the wire.

As in the preferred embodiment of the invention, the modification thereof also has a tubular lead retaining member 124 to enter the hook-shaped tangs and hold the leads in place. But, in this case, endwise motion of the retaining member to and from its operative position is produced by coupling the same to the tubular shield so that when the shield is projected to its position covering the commutator tangs, the retaining member is also moved to its operative position. The coupling between the shield and the retaining member comprises an annular groove 175 in the inner end of the retaining member and a roller 176 riding in the groove and mounted on the outer end of an arm 177 projecting from the adjacent rear end of the shield. The shield and the retaining member thus can be axially moved in unison while leaving the retaining member free to turn with the collet during indexing of the armature core.

To the extent that the preferred embodiment of the invention and its modification have common structure, the same reference numerals apply to both.

Those skilled in the art will appreciate that the invention can be practiced with apparatus other than as herein disclosed for purposes of illustration.

The invention is defined by the following claims:

1. In the winding of armatures by means of an automatic winding machine wherein an armature core assembly having a slotted core to receive the coils comprising the armature winding and a commutator with lead receiving tangs is held in winding receiving position while a rotating flyer winds wire drawn from a source thereof into a series of coils onto the slotted core and the ends of the individual coils as well as the beginning and end of the series of coils are attached to the tangs, the method of handling the wire at the termination of the winding of the last coil in the series and at the start of the winding of an unwound armature core assembly that has replaced the wound and removed armature, said method comprising the steps of:
   A. at the conclusion of the winding of the last coil in the series and while the just wound armature is still in winding receiving position, by means of a wire gripper gripping the stretch of wire that extends from the flyer to the armature;
   B. while said stretch of wire is thus gripped, severing the same at a point between its gripped portion and the armature to thereby free the just wound armature for removal from the machine;
   C. retaining the grip on the stretch of wire while the wound armature is removed from the machine and replaced with an unwound armature core assembly and at least until the winding of the first coil in the series to be wound onto said armature core assembly is begun; and
   D. releasing the grip which the wire gripper has on the severed stretch of wire in time to free the wire gripper for use in gripping the stretch of wire leading from the flyer at the completion of the winding of the last coil wound onto said armature coil assembly.

2. The method defined in claim 1, further characterized by the step of
   severing the stretch of wire that leads to the start of the first coil in the series while it is still gripped and before it is released.

3. In a method of automatically winding armatures having commutators with tangs wherein the armatures are wound and lead wire connections to the commutator tangs are formed at a winding station and a wound armature is removed from the winding station and replaced by an unwound armature, the method of handling a wire used in winding the armatures at the termination of the winding of the wound armature and the start of the winding of the unwound armature comprises the steps of:
   A. hooking the wire about a commutator tang adjacent the wound armature;
   B. clamping the wire immediately adjacent said tang;
   C. severing the wire between the tang and the portion thereof which is clamped;
   D. removing the wound armature and replacing it at the winding station by the unwound armature;
   E. looping the wire around a commutator tang of the unwound armature while maintaining the wire clamped; and F. severing the wire between the last mentioned tang and the portion thereof which is clamped.

4. The method of claim 3 wherein the wire is hooked to the first mentioned tang by rotating a flier used in winding coils in the armature in a direction opposite to the direction of movement of the flier when winding coils.

5. The method of claim 3 wherein the wire adjacent the first mentioned tang is engaged by movable clamp means after the wire is hooked thereto, and the wire is drawn by said movable clamp means to a fixed clamp means.

6. The method of claim 3 wherein the wire is looped about the last mentioned tang by rotating a flier used in winding coils in the armature in a first direction which is opposite to the direction of movement of the flier when winding coils, thereby to hook the wire about the rear face of the last mentioned tang, and then rotating the flier in the same direction of movement when winding coils while preventing the wire from becoming unhooked, thereby causing it to bend around the front of the last mentioned tang.

7. The method of claim 6 wherein a tang shield is moved into covering relation to the last mentioned tang, the tang shield having a surface confronting and spaced from the armature core along which the wire is guided over the front of the last mentioned tang.

8. The method of claim 7 wherein the shield is movable axially of the armature shaft to shield and expose the tangs, the shield being advanced toward the core to shield the last mentioned tang.

9. In a method of automatically winding armatures of the type having a slotted armature core and a commutator mounted upon an armature shaft, the end of said commutator confronting the armature core having as many wire lead receiving tangs as there are coils, said tangs having a front surface generally facing toward said armature core and a rear surface generally facing away from said armature core, the method being of the type wherein such armatures are wound and lead wire connections are formed at a winding station and a wound armature is removed from the winding station and replaced by an unwound armature, the winding of coils in the armature slots being done by a pair of rotating fliers with each of which is associated a wire strand used in forming the coils and the lead wire connections for a plurality of successively wound armatures, the method of severing the wire strands between a wound armature and an unwound armature comprising the steps of hooking said wire strands about the rear faces of a pair of spaced commutator tangs associated with the wound armature, clamping both of said wire strands adjacent said tangs, severing said wire strands between the points where said wires are clamped and said tangs, maintaining the clamping of said wire strands as the wound armature is removed and replaced by an unwound armature, wrapping said wire strands about a pair of commutator tangs of the unwound armature in preparation for the winding of coils in slots of said unwound armature, and again severing said wire strands between the clamped portions thereof and said last mentioned pair of commutator tangs.

10. In the winding of an armature of the type having a slotted armature core and a commutator with tangs on the end thereof confronting said core, each of said tangs having a front surface facing the core and a rear surface facing away from the core with an armature winding machine of the type having at least one rotating flier for laying wire into pairs of armature slots to form coils therein, the method of handling the wire used in winding the armature at the beginning of the winding, the wire being clamped adjacent its free end and held at a predetermined location adjacent the armature and extending to the flier from said location across the front face of a preselected tang to which a start wire is to be connected, said method including the steps of rotating the flier in a direction to cause the wire to be hooked to said tang while maintaining the wire clamped, the wire extending from said location across the front face of said tang and across the rear face of said tang to said flier, placing shield means adjacent said tang effective to guide the wire over the front face of said tang when said flier is rotated in a direction opposite to said first mentioned direction; and rotating said flier in a direction opposite to said first mentioned direction while retaining said shield means over said tang whereupon the wire is caused to be extended over the front face of said tang, the wire thus being completely looped about said tang.

11. The method of claim 10 further including the step of severing the wire between the clamped end thereof and the tang by cutter means moving in a direction substantially parallel to the armature shaft and away from the armature core.

12. The method of claim 10 wherein said shield means is mounted for movement axially of the armature shaft, said shield means being placed adjacent said tang by moving it axially toward the armature core and over said tang.

13. The method of winding an armature having a core with circumferentially spaced slots into spaced pairs of which at least one flyer rotatable in a fixed orbit successively winds the coils which collectively comprise that part of the armature winding that is wound by said flyer, the armature also having a commutator with a circle of circumferentially spaced tangs to which the leads connecting successive coils are attached, said method being characterized in that it minimizes wire waste and results in a wound armature in which the starting and ending leads of the winding terminate directly adjacent to the tangs to which they are attached, and said method comprising:
  A. holding the armature core axially fixed;
  B. by means of wire-gripping means that is constrained to motion in a defined path to and from a position adjacent to the circle of tangs, grasping and holding the end of the stretch of wire which extends from the flyer, adjacent to one of the circle of tangs;
  C. while the grasped end of the wire is thus held, looping said stretch of wire about a tang that is circumferentially spaced from the tang adjacent to the grasped end of the wire;
  D. holding the resulting loop against detachment from the tang;
  E. without releasing said loop, rotating the armature core to bring the tang about which the wire is looped substantially into alignment with said path to which motion of the wire-gripping means is constrained;
  F. during such rotation, moving the wire gripping means away from the wire-looped tang to thereby maintain tension on the length of wire which extends from the wire-looped tang to the wire-gripping means;

G. with said length of wire thus held taut, severing the same closely adjacent to the tang about which it is looped, whereby said length of wire is detached from the wire looped about the tang;

H. while the wire-gripping means retains its grasp upon said detached length of wire, proceeding with the winding of the successive coils onto the armature core;

I. actuating the wire-gripping means to release the detached length of wire in its grasp;

J. at the completion of the winding of the last coil wound onto the core by said flyer and the attachment of the ending lead thereof to its respective tang, effecting relative motion between the wire gripping means and the tang to which said ending lead is attached to bring the same into juxtaposition;

K. by means of said wire-gripping means, grasping the stretch of wire that leads from the flyer to said tang; and L. while the wire-gripping means has said stretch of wire in its grasp, severing the same closely adjacent to the tang.

14. The method of claim 1, further characterized by: before the gripper releases its grip on the severed stretch of wire which leads from the flyer to the wire gripper, attaching an intermediate portion thereof to a selected one of the commutator tangs to thereby divide said stretch of wire without interrupting its continuity into a first section which extends from the flyer to the selected tang and a second section which extends from the selected tang to the wire gripper; and thereafter severing said second section of said stretch of wire.

15. The method of claim 14, wherein the severance of said second section of said stretch of wire takes place close to the tang to which it is attached.

16. In the winding of armatures by means of an automatic winding machine wherein an armature core assembly having a slotted core to receive the coils comprising the armature winding and a commutator with lead receiving tangs is held in winding receiving position while a rotating flyer winds wire drawn from a source thereof into a series of coils onto the slotted core and the ends of the individual coils as well as the beginning and end of the series of coils are attached to the tangs, the method of handling the wire at the termination of the winding of the last coil in the series and at the starting of the winding of an unwound armature core assembly that has replaced the wound and removed armature, said method comprising the steps of:

A. at the conclusion of the winding of the last coil in the series and while the just wound armature is still in winding receiving position, by means of a wire gripper gripping the stretch of wire that extends from the flyer to the armature;

B. while said stretch of wire is thus gripped, severing the wire at a point between its gripped portion and the armature to thereby free the wound armature for removal from the machine;

C. retaining the grip on said stretch of wire while the wound armature is removed from the machine and replaced with an unwound armature core assembly;

D. without interrupting its continuity attaching said stretch of wire at a point intermediate its gripped portion and the flyer to a selected one of the commutator tangs to thereby divide said stretch of wire into a first section which extends from the flyer to the selected tang and a second section which extends from said tang to the gripper;

E. while the gripper retains its grip on the wire, severing said second section of said stretch thereof; and F. proceeding with the winding of the unwound armature core.

17. The method of claim 16 further characterized by: after said stretch of wire is attached to the selected tang and in preparation for its severance maintaining tension on said second section of the wire by moving the gripper.

18. In a method of automatically winding armatures having commutators with tangs wherein armatures are wound and lead wire connections to the commutator tangs are formed at a winding station an a wound armature is removed from the winding station and replaced by an unwound armature, the method of handling a wire used in winding the armatures at the termination of the winding of the wound armature and the start of the winding of the unwound armature comprising the steps of:

A. at the termination of the winding operation attaching the wire to a selected one of the commutator tangs;

B. by means of a wire gripper, gripping the wire at a point adjacent to said commutator tang;

C. by appropriate movement of the gripper tensioning the stretch of wire leading from the gripper to said selected commutator tang;

D. severing the tensioned stretch of wire;

E. removing the wound armature from the winding station and replacing it with an unwound armature;

F. while the gripper maintains its grip on the wire and without interrupting its continuity attaching the wire to a selected one of the commutator tangs of the unwound armature; and G. severing the wire at a point between the last mentioned tang and the gripper.

19. The method of claim 18, wherein during the winding of wire onto the armature the wire is kept from snagging on a tang by inserting the commutator into a tubular shielding device; and further characterized by effecting the said severance of the wire by placing the same between relatively movable shearing edges on the tubular shielding device, and effecting movement of said shearing edges towards one another.

20. In the winding of armatures by means of an automatic winding machine wherein an armature core assembly having a slotted core to receive the coils comprising the armature winding and a commutator with lead receiving tangs is held in winding receiving position while a rotating flyer winds wire drawn from a source thereof into a series of coils onto the slotted core and the ends of the individual coils as well as the beginning and end of the series of coils are attached to the tangs, the method of handling the wire at the termination of the winding of the last coil in the series and at the start of the winding of an unwound armature core assembly that has replaced the wound and removed armature, said method comprising the steps of:

A. at the conclusion of the winding of the last coil in the series and while the just wound armature is still in winding receiving position, by means of a wire gripper gripping the stretch of wire that extends from the flyer to the armature;

B. while said stretch of wire is thus gripped, severing the wire at a point between its gripped portion and the armature;

C. retaining the grip on said stretch of wire while the wound armature is removed from the machine and replaced with an unwound armature core assembly; and D. releasing the grip which the wire gripper has on said stretch of wire in time to free the wire gripper for use in gripping the stretch of wire leading from the flyer to the armature at the completion of the winding of the last coil wound onto said armature core assembly.

21. The method of claim 20, further characterized by effecting the severance of the wire by moving a cutting element along a path that is substantially parallel with the axis of the armature, lies between the armature and the gripped portion of said stretch of wire and has said stretch of wire crossing it and in position to be cut by the advancing cutting element.

22. In a method of winding coils of wire on an armature core mounted on a shaft and including the step of connecting wire leads extending from the coils to corresponding segments of a commutator also mounted on the shaft, the improvement which comprises:

A. positioning said commutator within the inner one of concentric inner and outer sleeves having complementary wire shearing edges;

B. positioning a wire lead extending from said commutator between said complementary shearing edges; and C. severing the wire lead by producing relative movement between said sleeves in the direction to effect relative movement of the shearing edges towards one another.

23. The improvement defined by claim 22, further characterized by effecting such relative disposition of the commutator and the concentric inner and outer sleeves that the shearing edges on said sleeves are closely adjacent to the point on the commutator from which the wire lead extends so that the wire lead is severed closely adjacent to the commutator.

24. The improvement defined by claim 22, wherein said relative movement between said sleeves is produced by moving the outer sleeve axially along the inner sleeve.

25. The improvement defined by claim 22, further characterized by gripping the wire lead extending from the commutator before it is severed, and maintaining tension on the wire lead as it is being severed.

* * * * *